(12) United States Patent
La Borde et al.

(10) Patent No.: US 9,598,187 B2
(45) Date of Patent: Mar. 21, 2017

(54) FEEDING BOTTLE PREPARATION ASSEMBLY

(71) Applicants: Anthony La Borde, Calgary (CA); Daron Gonzales, Calgary (CA)

(72) Inventors: Anthony La Borde, Calgary (CA); Daron Gonzales, Calgary (CA)

( * ) Notice: Subject to any disclaimer, the term of this patent is extended or adjusted under 35 U.S.C. 154(b) by 198 days.

(21) Appl. No.: 14/504,642

(22) Filed: Oct. 2, 2014

(65) Prior Publication Data
US 2016/0096638 A1 Apr. 7, 2016

(51) Int. Cl.
*B65B 43/60* (2006.01)
*B65B 3/04* (2006.01)
*A47J 31/40* (2006.01)
*B65B 43/50* (2006.01)
*A61J 9/00* (2006.01)

(52) U.S. Cl.
CPC .............. *B65B 3/04* (2013.01); *A47J 31/401* (2013.01); *A61J 9/00* (2013.01); *B65B 43/50* (2013.01)

(58) Field of Classification Search
CPC . B65B 3/04; B65B 43/50; B65B 43/60; A47J 31/401
USPC .......................... 141/2, 18, 21, 105–106, 168
See application file for complete search history.

(56) References Cited

U.S. PATENT DOCUMENTS

| | | | |
|---|---|---|---|
| 5,671,325 A * | 9/1997 | Roberson | A47J 31/56 222/146.5 |
| 5,797,313 A * | 8/1998 | Rothley | A47J 31/402 222/129.4 |
| 6,118,933 A | 9/2000 | Roberson | |
| 6,170,386 B1 | 1/2001 | Paul | |
| 6,253,028 B1 * | 6/2001 | Roberson | A47J 31/41 222/146.5 |
| 6,411,777 B2 * | 6/2002 | Roberson | A47J 31/401 222/146.5 |
| 6,412,527 B1 | 7/2002 | Brice | |
| 6,711,990 B1 * | 3/2004 | Harrison | A47J 31/401 222/129.4 |
| 6,766,106 B2 | 7/2004 | Roberson | |
| 6,829,431 B1 * | 12/2004 | Haven | A47J 31/40 222/129.1 |
| 6,951,166 B1 * | 10/2005 | Sickels | A47J 31/401 222/129.4 |
| 7,104,184 B2 * | 9/2006 | Biderman | A47J 31/40 99/282 |
| 7,863,546 B2 * | 1/2011 | Hestekin | A23L 1/296 219/497 |

(Continued)

*Primary Examiner* — Nicolas A Arnett

(57) ABSTRACT

A feeding bottle preparation assembly includes a housing. The housing has a fluid reservoir and a formula reservoir. A platform is movably coupled to the housing. The platform may support a plurality of bottles. A processor is coupled to the housing. An actuator is coupled to the housing and the processor. The actuator may actuate the processor. A control panel is coupled to the housing and the processor. The control panel may define operational parameters of the processor. A nozzle is coupled to the housing and the processor. The nozzle is in communication with the fluid and formula reservoirs. The nozzle may dispense the fluid and baby formula into the plurality of bottles. A motor is coupled to the housing and the processor. The motor is coupled to the platform. The platform may sequentially position each of the plurality of bottles under the nozzle.

13 Claims, 5 Drawing Sheets

(56) References Cited

U.S. PATENT DOCUMENTS

| | | | |
|---|---|---|---|
| 8,007,847 B2 * | 8/2011 | Biderman | A47J 31/40 426/231 |
| 8,131,137 B1 * | 3/2012 | Cowles | A47J 36/2433 392/386 |
| 8,167,006 B1 | 5/2012 | Mathis et al. | |
| 8,230,774 B1 | 7/2012 | Hunte | |
| 8,261,944 B2 | 9/2012 | Krause et al. | |
| 8,360,279 B1 | 1/2013 | Giles | |
| D679,934 S | 4/2013 | Majdecki, Jr. | |
| 8,584,901 B2 * | 11/2013 | Dooley | A47J 31/401 222/129.4 |
| 8,601,938 B2 * | 12/2013 | Huber | A47J 31/404 99/289 R |
| 9,022,081 B2 * | 5/2015 | Armstrong | A47J 31/401 141/104 |
| 9,345,360 B2 * | 5/2016 | Sims | A47J 31/407 |
| 2004/0261625 A1 | 12/2004 | Fowlkes | |
| 2005/0173015 A1 * | 8/2005 | Dhaliwal | A01K 9/00 141/2 |
| 2005/0230343 A1 * | 10/2005 | Huber | A47J 31/404 215/387 |
| 2006/0150821 A1 * | 7/2006 | Paul | A47J 31/401 99/279 |
| 2006/0278093 A1 * | 12/2006 | Biderman | A47J 31/40 99/282 |
| 2007/0034084 A1 * | 2/2007 | Shertok | A47J 31/404 99/279 |
| 2007/0261566 A1 * | 11/2007 | Varney | A47J 31/404 99/300 |
| 2008/0110935 A1 * | 5/2008 | Huber | A47J 31/404 222/221 |
| 2008/0160153 A1 * | 7/2008 | Hestekin | A23L 1/296 426/590 |
| 2010/0068354 A1 * | 3/2010 | Roberson | B65D 85/8043 426/118 |
| 2010/0133222 A1 * | 6/2010 | Mathieu | A47J 31/40 215/11.3 |
| 2011/0163127 A1 * | 7/2011 | DiBella-Lenaway | A47J 31/401 222/145.6 |
| 2013/0032611 A1 * | 2/2013 | Dooley | A47J 31/401 222/129.4 |
| 2013/0200101 A1 * | 8/2013 | Dooley | B67D 7/78 222/129.4 |

\* cited by examiner

FEEDING BOTTLE PREPARATION ASSEMBLY

BACKGROUND OF THE DISCLOSURE

Field of the Disclosure

The disclosure relates to food preparation devices and more particularly pertains to a new food preparation device for preparing baby formula in a plurality of bottles.

SUMMARY OF THE DISCLOSURE

An embodiment of the disclosure meets the needs presented above by generally comprising a housing structured such that a bottle area is defined in the housing. The housing is further structured such that a fluid reservoir and a formula reservoir are defined in the housing. The fluid and formula reservoirs may each contain an associated one of a fluid and a baby formula. A platform is movably coupled to the housing. The platform may support a plurality of bottles in the bottle area. A processor is coupled to the housing. An actuator is coupled to the housing. The actuator is operationally coupled to the processor. The actuator may actuate the processor. A control panel is coupled to the housing. The control panel is operationally coupled to the processor. The control panel may define operational parameters of the processor. A nozzle is coupled to the housing. The nozzle is operationally coupled to the processor. The nozzle is in communication with the fluid and formula reservoirs. The nozzle may dispense the fluid and baby formula into the plurality of bottles according to the defined operational parameters of the processor. A motor is coupled to the housing. The motor is operationally coupled to the processor. The motor is coupled to the platform. The platform may sequentially position each of the plurality of bottles under the nozzle according to the defined operational parameters of the processor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
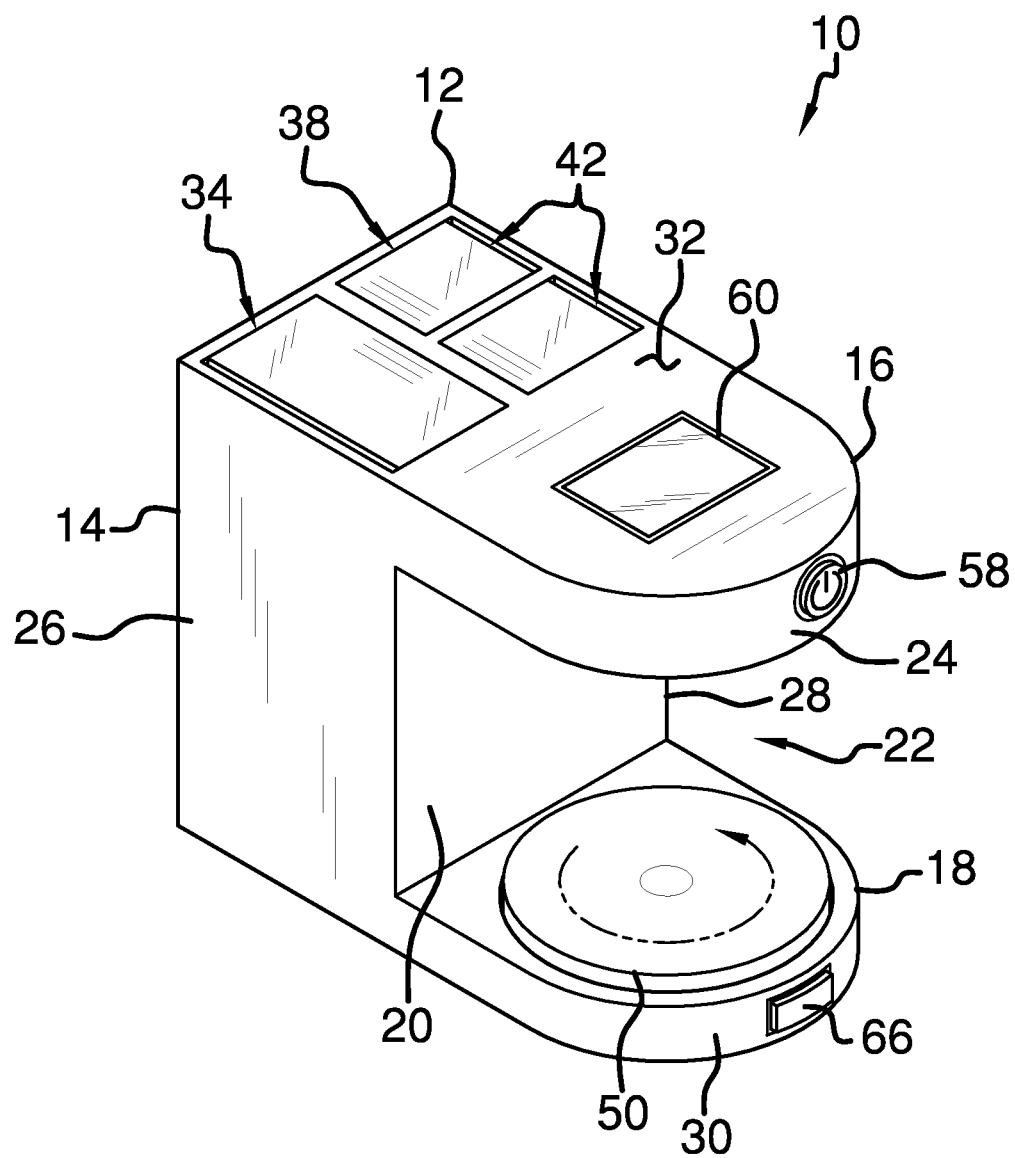
FIG. 1 is a perspective view of a feeding bottle preparation assembly according to an embodiment of the disclosure.
Figure 2:
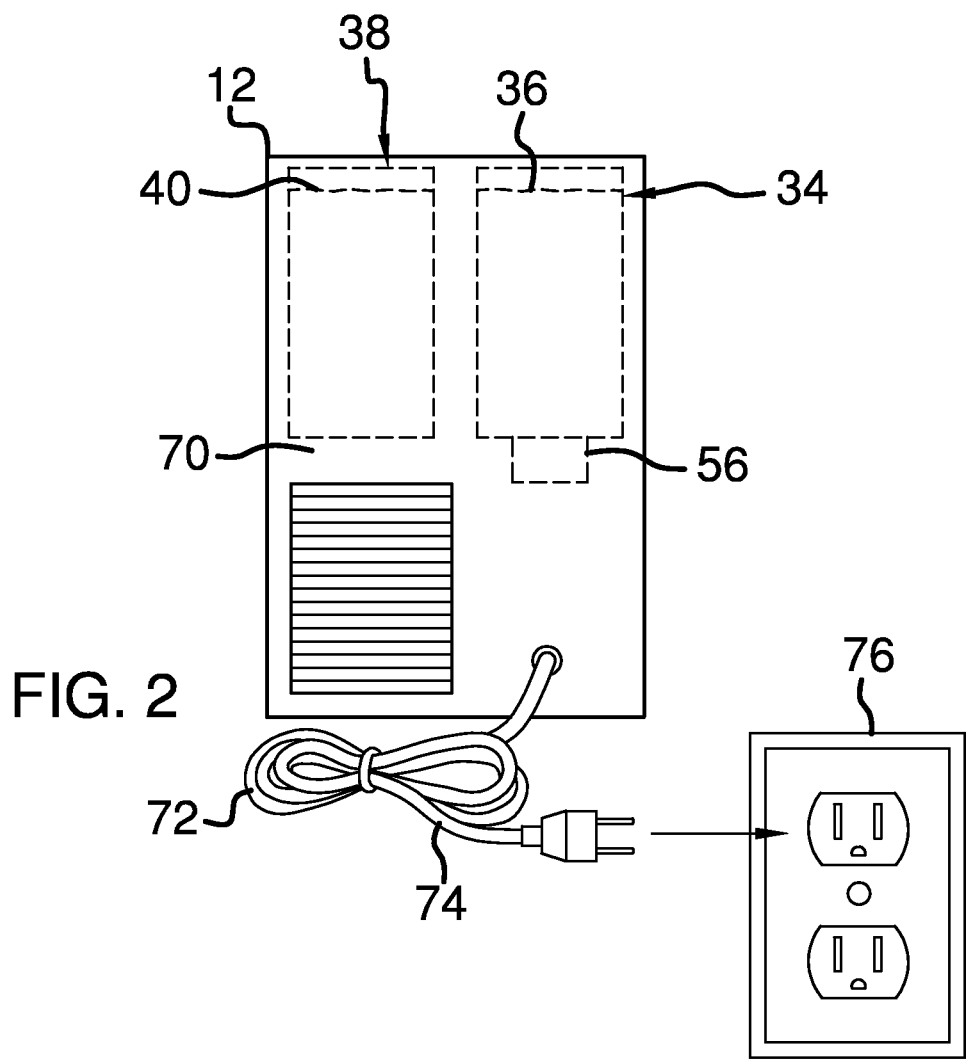
FIG. 2 is a back view of an embodiment of the disclosure.
Figure 3:
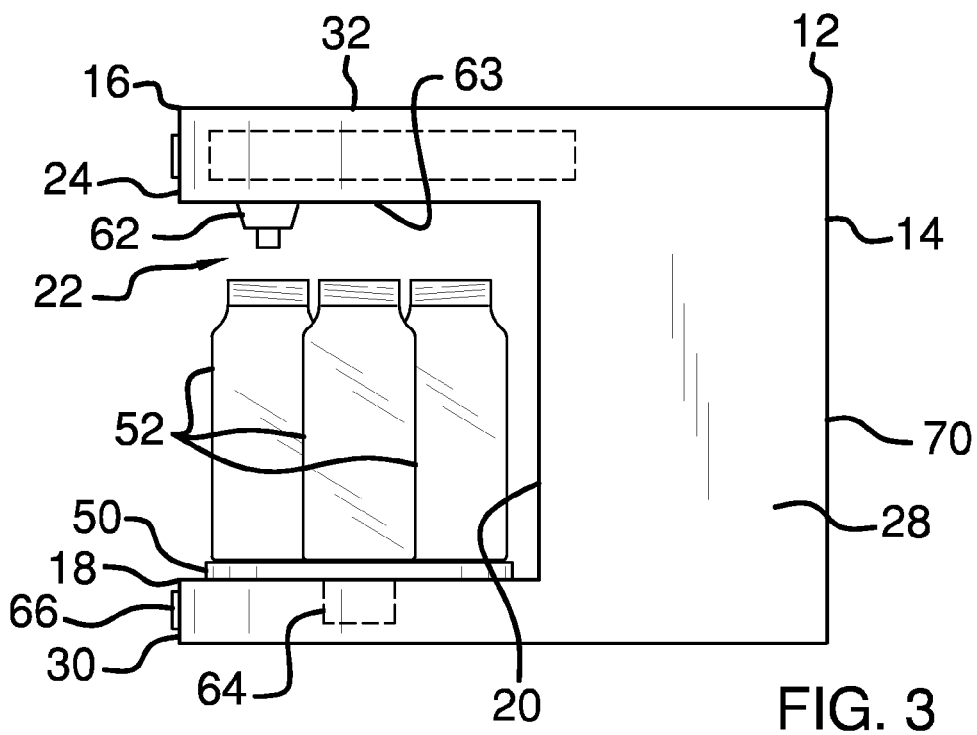
FIG. 3 is a left view of an embodiment of the disclosure.
Figure 4:
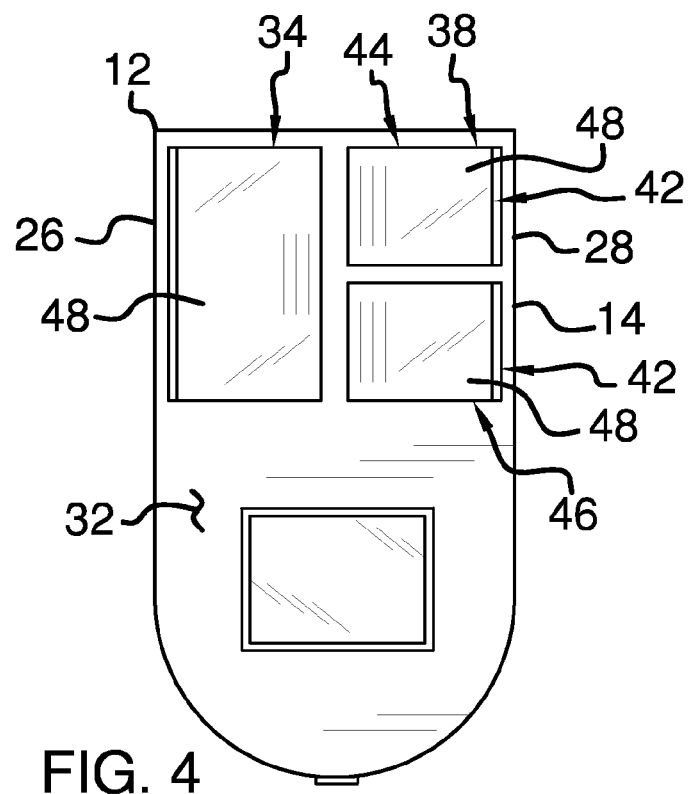
FIG. 4 is a top view of an embodiment of the disclosure.
Figure 5:
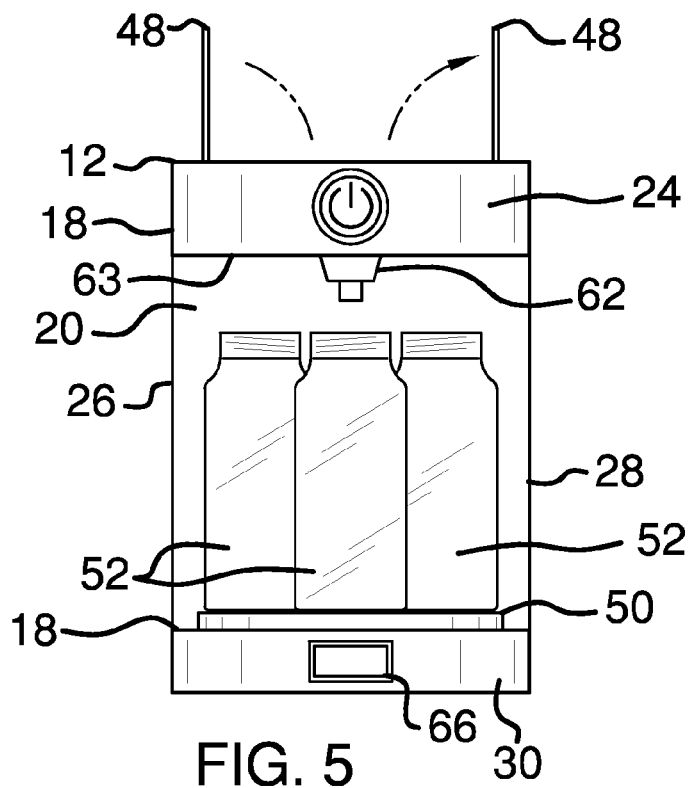
FIG. 5 is a front view of an embodiment of the disclosure.
Figure 6:
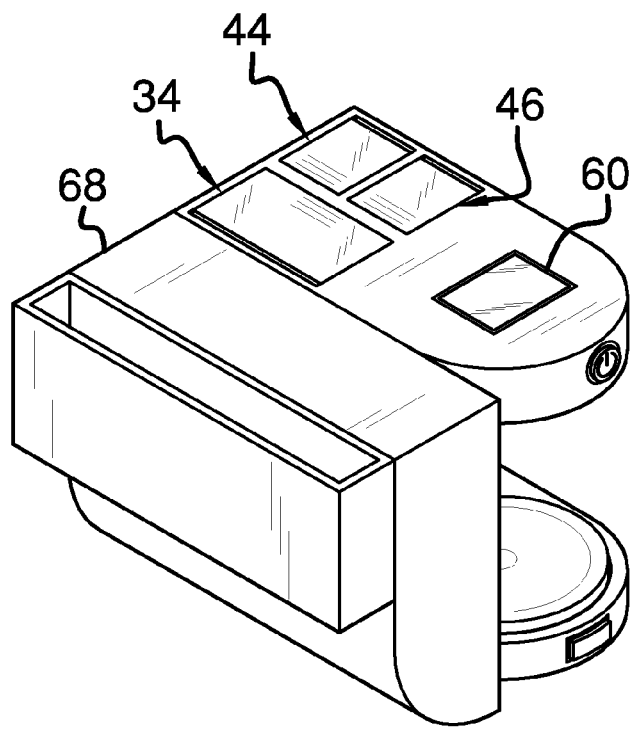
FIG. 6 is a top perspective view of an alternative embodiment of the disclosure.
Figure 7:
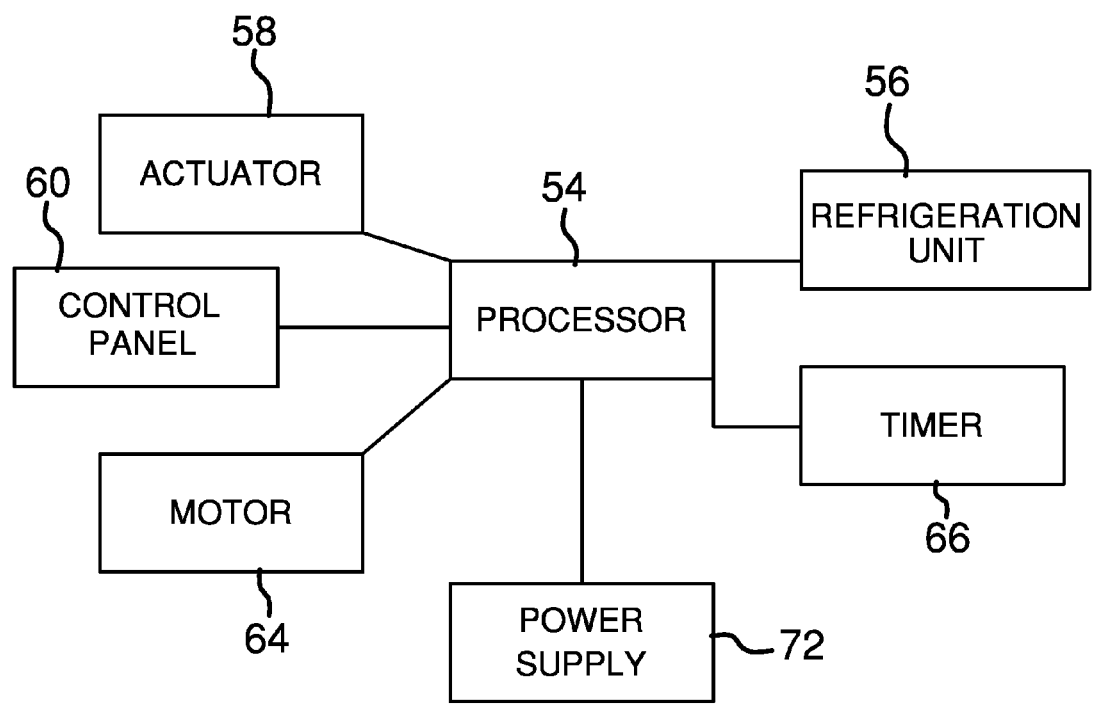
FIG. 7 is a schematic view of an embodiment of the disclosure.

With reference now to the drawings, and in particular to FIGS. 1 through 7 thereof, a new food preparation device embodying the principles and concepts of an embodiment of the disclosure and generally designated by the reference numeral 10 will be described.

As best illustrated in FIGS. 1 through 7, the feeding bottle preparation assembly 10 generally comprises a housing 12. The housing 12 has an outer wall 14. Each of a top side 16 and a bottom side 18 of the outer wall 14 of the housing 12 extends forwardly from a front side 20 of the outer wall 14 of the housing 12. A bottle area 22 is defined between the top 16 and bottom 18 sides of the outer wall 14 of the housing 12. A leading edge 24 of the top side 16 of the outer wall 14 of the housing 12 curves between each of a first lateral side 26 and a second lateral side 28 of the outer wall 14 of the housing 12. Additionally, a forwardmost edge 30 of the bottom side 18 of the housing 12 curves between the first 26 and second 28 lateral sides of the outer wall 14 of the housing 12.

An uppermost surface 32 of the top side 16 of the outer wall 14 of the housing 12 has the fluid reservoir 34 extending downwardly therein. The fluid reservoir 34 may contain a fluid 36. The fluid 36 may be water. Additionally, the uppermost surface 32 of the top side 16 of the outer wall 14 of the housing 12 has the formula reservoir 38 extending downwardly therein. The formula reservoir 38 may contain a baby formula 40.

The formula reservoir 38 is one of a pair of formula reservoirs 42. A first one 44 of the formula reservoirs 42 may contain a liquid baby formula of any conventional design. A second one 46 of the formula reservoirs 42 may contain a powder baby formula of any conventional design. A plurality of lids 48 is each hingedly coupled to the uppermost surface 32 of the top side 16 of the outer wall 14 of the housing 12. Each of the lids 48 closes an associated one of the fluid 34, first formula 44 and second formula 46 reservoirs.

A platform 50 is movably coupled to the housing 12. The platform 50 may support a plurality of bottles 52 in the bottle area 22. The bottles 52 may be infant feeding bottles of any conventional design. A processor 54 is coupled to the housing 12. The processor 54 may be an electronic processor of any conventional design.

A refrigeration unit 56 is coupled to the housing 12. The refrigeration unit 56 is electrically coupled to the processor 54. The refrigeration unit 56 cools the first formula reservoir 44. Additionally, the refrigeration unit 56 may have an operational temperature between 50° and 60° Fahrenheit.

An actuator 58 is coupled to the leading edge 24 of the top side 16 of the outer wall 14 of the housing 12. The actuator 58 is electrically coupled to the processor 54 so the actuator 58 may actuate the processor 54. A control panel 60 is coupled to the uppermost surface 32 of the top side 16 of the outer wall 14 of the housing 12. The control panel 60 is electrically coupled to the processor 54. Moreover, the control panel 60 may define operational parameters of the processor 54. The control panel 60 may be a touch screen control panel of any conventional design.

A nozzle 62 is coupled to a lower surface 63 of the top side 16 of the outer wall 14 of the housing 12. The nozzle 62 is positioned within the bottle area 22. Additionally, the nozzle 62 is electrically coupled to the processor 54. The nozzle 62 is in fluid communication with the fluid 34, first 44 and second 46 formula reservoirs. The nozzle 62 may dispense the fluid 36 and baby formula 44 into the bottles 52 according to the defined operational parameters of the processor 54. Additionally, the nozzle 62 may be an electrically actuated nozzle of any conventional design.

A motor 64 is coupled to the housing 12. The motor 64 is electrically coupled to the processor 54. The motor 64 is mechanically coupled to the platform 50 so the platform 50 may sequentially position each of the bottles 52 under the nozzle 62 according to the defined operational parameters of the processor 54. The motor 64 may be an electrical motor of any conventional design.

A timer 66 is coupled to the forwardmost edge 30 of the bottom side 18 of the outer wall 14 of the housing 12. The timer 66 is electrically coupled to the processor 54. The timer 66 may be actuated to determine a duration of time between the operational parameters of the processor 54.

A power supply 72 is coupled to the housing 12. The power supply 72 is electrically coupled to the processor 54. The power supply 72 comprises a power cord 74 extending outwardly from a back side 70 of the outer wall 14 of the housing 12. The power cord 74 is electrically coupled to a power source 76. The power source 76 may be an electrical outlet of any conventional design.

Alternatively, a sterilizing unit 68 is provided. The sterilizing unit 68 is removably coupled to the first lateral side 26 of the outer wall 14 of the housing 12. Additionally, the sterilizing unit 68 extends between the back side 70 and the leading 24 and forwardmost 30 edges of the top 16 and bottom 18 sides of the outer wall 14 of the housing 12. The bottles 52 may be placed within the sterilizing unit 68 to sterilize the bottles 52. The sterilization unit 68 may be an infra-red sterilization unit of any conventional design.

In use, the bottles 52 are placed on the platform 50. The control panel 60 is used to enter the operational parameters of the processor 54 to include an amount of fluid 36 and type of baby formula 40 to be delivered into each of the bottles 52. The timer 66 is used to establish a duration of time between each of the bottles 52 being filled with the fluid 36 and the baby formula 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A feeding bottle preparation assembly comprising:
   a housing structured such that a bottle area is defined in said housing, said housing being further structured such that a fluid reservoir and a formula reservoir are defined in said housing wherein said fluid and formula reservoirs are each configured to contain an associated one of a fluid and a baby formula, said formula reservoir being one of a pair of formula reservoirs, a first one of said reservoirs being configured for containing a liquid baby formula, a second one of said formula reservoirs being configured for holding a powder baby formula;
   a refrigeration unit coupled to said housing, said refrigeration unit cooling said first one of said formula reservoirs;
   a platform movably coupled to said housing such that said platform is configured to support a plurality of bottles in said bottle area;
   a processor coupled to said housing;
   an actuator coupled to said housing, said actuator being operationally coupled to said processor such that said actuator is configured to actuate said processor;
   a control panel coupled to said housing, said control panel being operationally coupled to said processor such that said control panel is configured to define operational parameters of said processor;
   a nozzle coupled to said housing, said nozzle being operationally coupled to said processor, said nozzle being in communication with said fluid and formula reservoirs such that said nozzle is configured to dispense the fluid and baby formula into the plurality of bottles according to the defined operational parameters of said processor; and
   a motor coupled to said housing, said motor being operationally coupled to said processor, said motor being coupled to said platform such that said platform is configured to sequentially position each of the plurality of bottles under said nozzle according to the defined operational parameters of said processor.

2. The feeding bottle preparation assembly assembly according to claim 1, further comprising said housing having an outer wall, each of a top side and a bottom side of said outer wall of said housing extending forwardly from a front side of said outer wall of said housing such that said bottle area is defined between said top and bottom sides of said outer wall of said housing.

3. The feeding bottle preparation assembly according to claim 2, further comprising said platform being rotatably coupled to an upper surface of said bottom side of said outer wall of said housing such that said platform is positioned within said bottle area.

4. The feeding bottle preparation assembly according to claim 2, further comprising an uppermost surface of said top side of said outer wall of said housing having said fluid reservoir extending downwardly therein.

5. The feeding bottle preparation assembly according to claim 2, further comprising an uppermost surface of said top side of said outer wall of said housing having said formula reservoir extending downwardly therein.

6. The feeding bottle preparation assembly according to claim 2, further comprising said actuator being coupled to a leading edge of said top side of said outer wall of said housing, said actuator being electrically coupled to said processor.

7. The feeding bottle preparation assembly according to claim 2, further comprising said control panel being coupled to an uppermost surface of said top side of said outer wall of said housing, said control panel being electrically coupled to said processor.

8. The feeding bottle preparation assembly according to claim 2, further comprising said nozzle being coupled to a lower surface of said top side of said outer wall of said housing such that said nozzle is positioned within said bottle area, said nozzle being electrically coupled to said processor, said nozzle being in fluid communication with said fluid and formula reservoirs.

9. The feeding bottle preparation assembly according to claim 1, further comprising said motor being electrically coupled to said processor, said motor being mechanically coupled to said platform.

10. The feeding bottle preparation assembly according to claim 1, further comprising a power supply coupled to said housing.

11. The feeding bottle preparation assembly according to claim 10, further comprising said power supply being electrically coupled to said processor.

12. The feeding bottle preparation assembly according to claim 11, further comprising said power supply comprising a power cord extending outwardly from an outer wall of said housing, said power cord being electrically coupled to a power source.

13. A feeding bottle preparation assembly comprising:
a housing having an outer wall, each of a top side and a bottom side of said outer wall of said housing extending forwardly from a front side of said outer wall of said housing such that a bottle area is defined between said top and bottom sides of said outer wall of said housing, said housing being further structured such that a fluid reservoir and a formula reservoir are defined in said housing wherein said fluid and formula reservoirs are each configured to contain an associated one of a fluid and a baby formula;
an uppermost surface of said top side of said outer wall of said housing having said fluid reservoir extending downwardly therein such that said fluid reservoir is configured to contain the fluid;
said uppermost surface of said top side of said outer wall of said housing having said formula reservoir extending downwardly therein such that said formula reservoir is configured to contain the baby formula;
said formula reservoir being one of a pair of formula reservoirs, a first one of said reservoirs being configured for containing a liquid baby formula, a second one of said formula reservoirs being configured for holding a powder baby formula;
a refrigeration unit coupled to said housing, said refrigeration unit cooling said first one of said formula reservoirs;
a platform movably coupled to said housing such that said platform is configured to support a plurality of bottles in said bottle area;
a processor coupled to said housing;
an actuator coupled to a leading edge of said top side of said outer wall of said housing, said actuator being electrically coupled to said processor such that said actuator is configured to actuate said processor;
a control panel coupled to said uppermost surface of said top side of said outer wall of said housing, said control panel being electrically coupled to said processor such that said control panel is configured to define operational parameters of said processor;
a nozzle coupled to a lower surface of said top side of said outer wall of said housing such that said nozzle is positioned within said bottle area, said nozzle being electrically coupled to said processor, said nozzle being in fluid communication with said fluid and formula reservoirs such that said nozzle is configured to dispense the fluid and baby formula into the plurality of bottles according to the defined operational parameters of said processor;
a motor coupled to said housing, said motor being electrically coupled to said processor, said motor being mechanically coupled to said platform such that said platform is configured to sequentially position each of the plurality of bottles under said nozzle according to the defined operational parameters of said processor; and
a power supply coupled to said housing, said power supply being electrically coupled to said processor, said power supply comprising a power cord extending outwardly from said outer wall of said housing, said power cord being electrically coupled to a power source.

* * * * *